United States Patent [19]
Rhodes

[11] 3,862,283
[45] Jan. 21, 1975

[54] METHOD FOR SINTERING A YTTRIA STABILIZED ZIRCONIA BODY INCORPORATING THORIUM OXIDE AS A SINTERING AID

[75] Inventor: William H. Rhodes, Lexington, Mass.

[73] Assignee: The United States of America as represented by the Secretary of the Air Force, Washington, D.C.

[22] Filed: Aug. 28, 1973

[21] Appl. No.: 392,387

[52] U.S. Cl. ................... 264/56, 264/66, 264/125, 264/332, 106/57
[51] Int. Cl. .. C04b 35/64, C04b 35/70, C04b 35/48
[58] Field of Search ................ 264/56, 65, 66, 332; 106/57; 423/69, 71

[56] References Cited
UNITED STATES PATENTS
3,640,887 2/1972 Anderson ........................... 264/6 S

*Primary Examiner*—Donald J. Arnold
*Assistant Examiner*—John Parrish
*Attorney, Agent, or Firm*—Harry A. Herbert, Jr.; William J. O'Brien

[57] ABSTRACT

A method for sintering a stabilized zirconia body by incorporating thorium oxide as a grain growth inhibiting additive into a batch of powdered zirconia prior to sintering.

2 Claims, 1 Drawing Figure

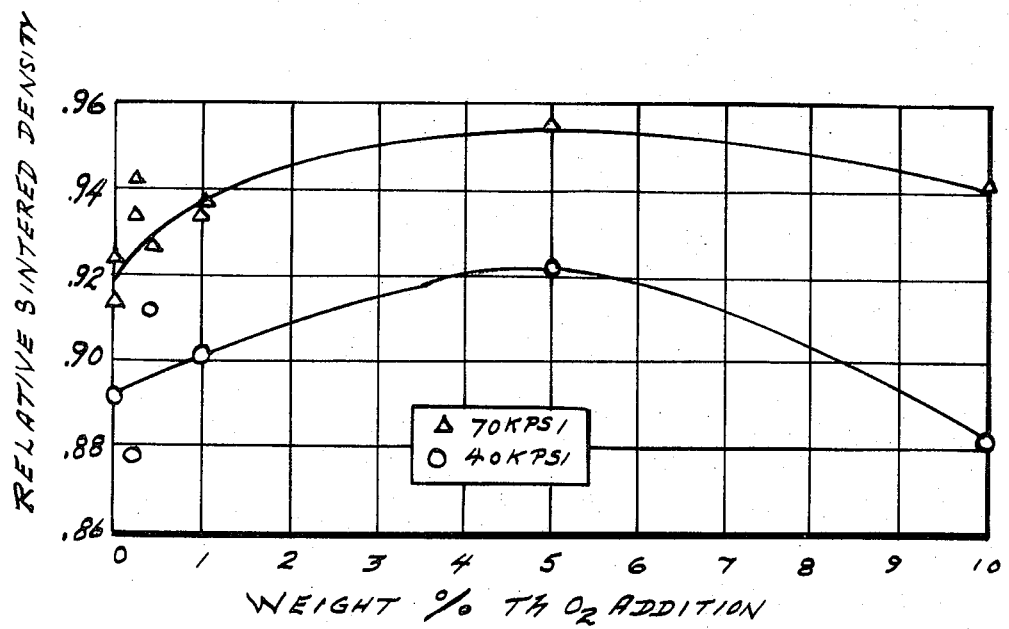

METHOD FOR SINTERING A YTTRIA STABILIZED ZIRCONIA BODY INCORPORATING THORIUM OXIDE AS A SINTERING AID

BACKGROUND OF THE INVENTION

The present invention relates to the sintering of zirconia. More particularly, this invention relates to the use of thorium oxide as a single phase sintering aid for oxide or zirconia refractories.

The utilization of zirconia as a refractory material has long been of importance because of its extremely high melting point and chemical inertness in the presence of a wide variety of chemical materials. When stabilized to its cubic form, it is important for many present day aerospace and commercial applications. It is particularly attractive for present day use because it is the second most stable refractory oxide and an excellent thermal insulator; this latter prospect derives from its very low thermal conductivity. Furthermore, at temperatures above 900°C, it is an excellent ionic conductor. It is this latter property, combined with the thermochemical stability and low thermal conductivity that makes stabilized zirconia unique among refractory compounds.

Unfortunately, most sintering aids for stabilized zirconia result in the formulation of a multiphase zirconia body which compromises such properties as refractroriness, high temperature creep resistance and optical properties. Because of the low cation diffusion rate of zirconia, sintering temperatures in the neighborhood of 2000°C or more are needed to consolidate a single phase stabilized zirconia to 95 percent or greater of theoretical density. In order to avoid these high temperatures, most commercial zirconia is doped or left impure to promote a desirable densification by liquid phase sintering at more readily obtainable temperatures in the area of 1500° to 1550°C.

With this invention, however, it has been found that the addition of thoria, or thorium oxide to a batch of zirconia perior to sintering results in the formation of a relatively pure, single phase zirconia body at sintering temperatures considerably lower than employed heretofore. The resultant zirconia body is a stable solid solution of cubic crystal structure up to its melting point that can cool without enough change in volume to develop objectionable cracks in its cooled state.

SUMMARY OF THE INVENTION

In accordance with this invention, it has been found that thoria, or thorium oxide, provides an excellent sintering additive for stabilized zirconia. The thoria is added to a batch of zirconia prior to sintering in concentrations of from about 0.2 to 10 percent by weight which are within the solid solution field.

Accordingly, the primary object of this invention is to provide a method for sintering stabilized zirconia at relatively low temperatures.

Another object of this invention is to provide a sintering aid for zirconia that results in the formation of a single phase low porosity sintered zirconia product.

Still another object of this invention is to provide a method that employs thoria as a sintering aid for stabilized zirconia.

The above and still other objects and advantages of the present invention will become more readily apparent upon consideration of the following detailed description thereof, when taken in conjunction with the accompanying drawing.

DESCRIPTION OF THE DRAWING

In the drawing:

The FIGURE represents a graphical illustration showing the effect of thorium oxide additions on sintered densities for zirconia samples cold pressed at 70 and 40 KPSI and sintered under a 1500°C — 4 hour cycle.

DESCRIPTION OF THE PREFERRED EMBODIMENT

With the above-mentioned and other objects on view, the present invention contemplates a new and improved method for sintering stabilized zirconia. In essence, the invention is predicated upon the discovery that thoria, or thorium oxide, is an excellent sintering aid for stabilizing zirconia. The thoria, in finely divided form, is introduced into a batch of zirconia as an additive material in amounts ranging from about 0.2 to 10.0 percent by weight of the final powder mix. The zirconia used in the exercise of this invention is chemically pure 6.5 mole percent yttria stabilized zironium dioxide having a particulate size of about 10 microns or less. The powder mixture is then introduced into conventional mixing apparatus, such as a porcelain ball, and mixed intimately for about an hour in order to assure proper mixing. The resultant dry mix is then formed into a desired shape by dry pressing. The shaped body is then placed into a conventional furnace and fired or sintered in accordance with conventional sintering techniques, using either air or oxygen as the sintering environment. Firing is accomplished at temperatures of from about 1400° to 1900°C for periods of from about 4 to 19 hours with firing temperatures of from 1500° to 1550°C being preferable. Densities of from 95 percent to 98 percent with an impurity pickup of less than 0.1 percent were accomplished by the technique of this invention.

With the foregoing general discussion in mind, there are presented, in Table I which follows, a number of examples which illustrates to those skilled in the art the manner in which this invention is carried into effect.

TABLE I

EFFECT OF THORIA ON SINTERING

| Ex. No. | Wt. percent $THO_2$ | Cold Pressing Pressure | Sintered Relative Density |
|---|---|---|---|
| 1 | 0.2 | 40 | 0.878 |
| 2 | 0.2 | 70 | 0.934 |
| 3 | 0.4 | 40 | 0.912 |
| 4 | 0.4 | 70 | 0.929 |
| 5 | 1.0 | 40 | 0.901 |
| 6 | 1.0 | 70 | 0.935 |
| 7 | 5.0 | 40 | 0.922 |
| 8 | 5.0 | 70 | 0.955 |
| 9 | 10.0 | 40 | 0.882 |
| 10 | 10.0 | 70 | 0.941 |
| 11 | 0.2 | 70 | 0.942 |
| 12 | 1.0 | 70 | 0.936 |
| 13 | 5.0 | 70 | 0.999 |

The sample of zirconia in examples 1 to 12 were sintered at 1500°C for 4 hours in air, while the sample in example 13 was sintered at 1550°C for 19 hours in oxygen.

In the examples of Table I, the thorium oxide was added as the nitrate in a water solution. The slip was wet ball milled using zirconia balls and a polyethylene jar. The dried powder was pressed into samples and fired in air, thus allowing for the conversion to $ThO_2$ during the initial stages of sintering.

The results are plotted in the FIGURE of the drawing and compare the effectiveness of the $ThO_2$ with the undoped powder and the compositions tested. An increase in sintered bulk density up to 5 wt. percent $ThO_2$ was realized. The fact that the 10 wt. percent composition gave lower density was taken as proof that the additive was affecting the sintering characteristics of the powder and not just affecting the theoretical density of the mix. The sample in example 13 containing 5 percent $ThO_2$ was given an extended sintering cycle. The sample was highly translucent and had a bulk density of 6.071 gm/cc, the highest measured on the program. However, it was cracked and the microstructure illustrated that mixing was inhomogeneous.

The microstructure of a 1 wt. percent addition shows fully dense islands within a more porous matrix. The starting undoped powder gave uniform microstructures, thus the observed dense regions are not a result of dominant intra-agglomerate sintering. The grain size was 2.6 microns as compared with 7.6 microns for undoped zirconia powder receiving an identical sintering cycle. The results indicate that $ThO_2$ is an effective grain growth inhibiter and sintering aid. Further, the 5 wt. percent addition appears to be near the proper level to gain optimum benefit.

As disclosed herein, thoria is added to the zirconia in a concentration which is within the solid solution field. The thorium ions segragete to the grain boundaries limiting grain growth, thus allowing more time for pore removal prior to pore entrapping grain growth. Thus, higher relative densities are achieved during sintering without the formation of a discrete second phase. The zirconia products produced in accordance with the concept of this invention are single phase which maintain their intrinsic properties such as refractoriness, creep strength and optical properties.

What is claimed is:

1. A method for effecting the sintering of yttria stabilized zirconia comprising the steps of
    a. forming an intimate mixture in dry powder form composed of about 0.2 to 10.0 percent by weight of thorium oxide with the balance substantially all yttria stabilized zirconia;
    b. compressing said powdered mixture into a body of predetermined shape; and
    c. sintering said compressed body at a temperature of from about 1400° to 1900°C for a period of about 4 to 19 hours thereby forming a sintered zirconia body stabilized to its cubic crystalling form.

2. A method in accordance with claim 1 wherein said mixture is composed of about 5.0 percent by weight of thorium oxide and said body is sintered at a temperature of about 1500°C for about 4 hours.

* * * * *